(No Model.) 2 Sheets—Sheet 1.

H. A. BRADLEY.
KILN FOR DRYING CEMENT.

No. 375,920. Patented Jan. 3, 1888.

(No Model.)  2 Sheets—Sheet 2.

H. A. BRADLEY.
KILN FOR DRYING CEMENT.

No. 375,920.  Patented Jan. 3, 1888.

WITNESSES:

INVENTOR
Henry A. Bradley
BY
Briesen & Steele.
ATTORNEYS

UNITED STATES PATENT OFFICE.

HENRY A. BRADLEY, OF NEW YORK, N. Y., ASSIGNOR OF ONE-HALF TO JOHN J. GORMAN, OF SAME PLACE.

KILN FOR DRYING CEMENT.

SPECIFICATION forming part of Letters Patent No. 375,920, dated January 3, 1888.

Application filed April 6, 1887. Serial No. 233,855. (No model.)

*To all whom it may concern:*

Be it known that I, HENRY A. BRADLEY, of the city, county, and State of New York, have invented an Improved Kiln for Drying Cement, &c., of which the following is a full, clear, and exact description.

The object of my invention is to provide a kiln for drying cement in which the moisture will be thoroughly driven off from the cement, leaving it perfectly dry, in the most expeditious manner. This process is commonly called "burning cement."

The invention consists in a series of inclined plates or landings arranged in a spiral on the inside of a kiln and narrower than the radius of the kiln, forming a central flue, and an inlet and outlet for the article to be dried leading to and from said inclined plates.

The invention also consists in a ledge on the edge of each of said inclined plates, for the purpose hereinafter described.

Reference is to be had to the accompanying drawings, forming part of this specification, in which—

Figure 1:
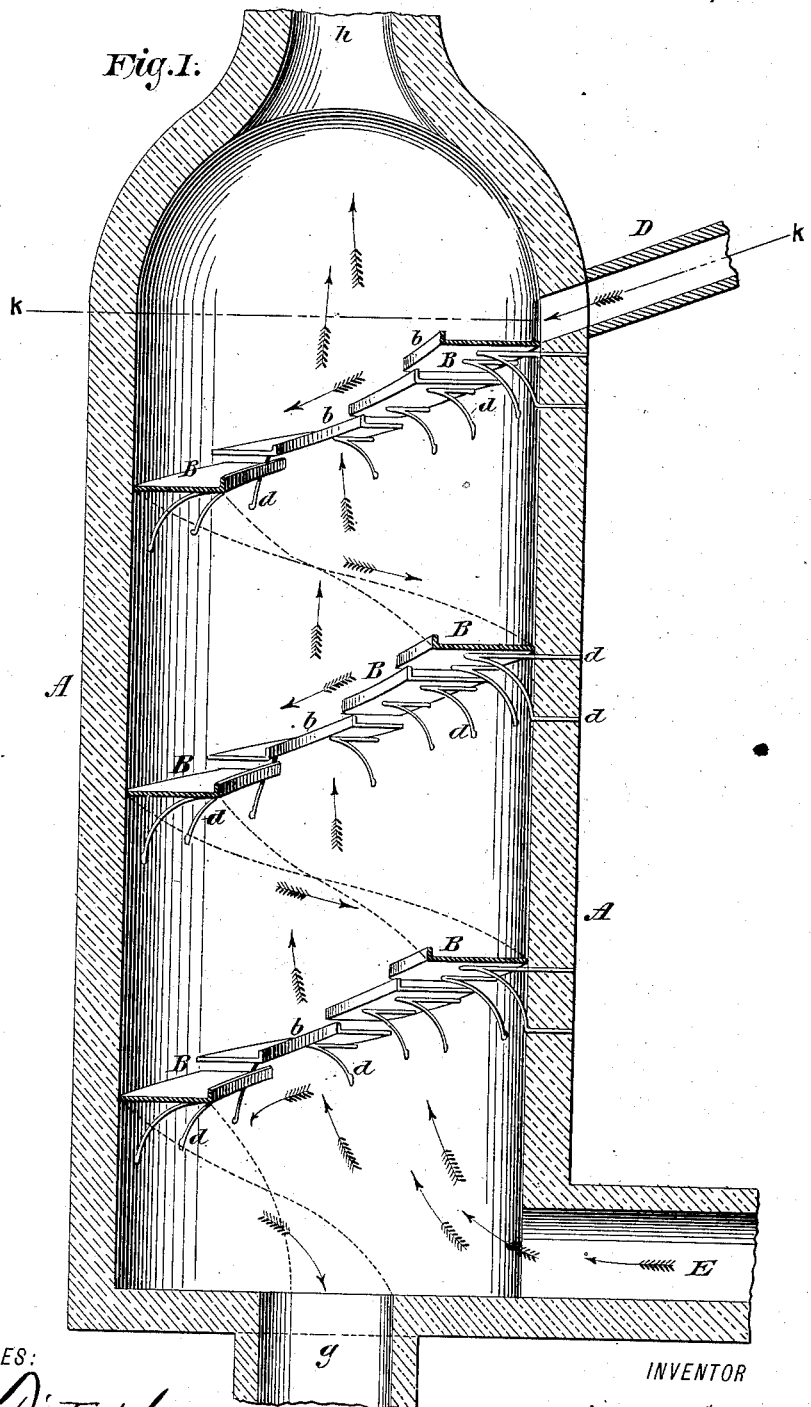
Figure 2:
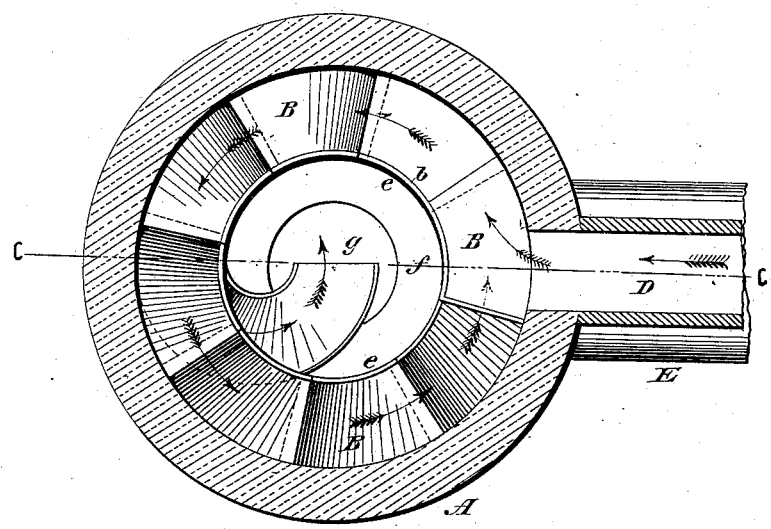

Figure 1 is a vertical central section of my improved kiln taken on line $c\ c$, Fig. 2, and Fig. 2 is a cross-section of the same taken on the line $k\ k$, Fig. 1.

A in the accompanying drawings represents my improved kiln, which is preferably tubular. B are a series of inclined plates or landings, arranged against the inner wall of the kiln in spiral form. Each of these plates B may have its outer edge turned up to form a ledge, as at $b$, to prevent the cement in its passage through the kiln from falling off the edges of the plates B. The plates B may be held in the kiln in any convenient manner, in this instance being held by brackets $d$, arranged in and projecting from the inner wall of the kiln, to which the plates B are attached.

The plates B are inclined from their upper edge toward their lower edge, so that the cement will pass or slide along from one to the other. The plates B overlap one another—that is to say, the lower edge of one plate B projects somewhat over the upper edge of the next lower plate, and so on all the way down to the outlet $g$ at the bottom of the kiln. The plates B do not extend to the center of the kiln, but are narrower than the radius of the kiln, thus leaving a clear passage or flue, $f$, for the heated air or gases of combustion.

The cement is fed into the kiln through the chute D, and falls onto the uppermost inclined plate B, where it is warmed by the heated air or gas passing through the flue $f$. It then passes successively over each plate B, through the kiln, and out through the outlet $g$, where it is caught in any suitable receiver. The heated air or gases of combustion from any suitable generator pass into the kiln through the inlet E, and up through the flue $f$ and outlet $h$ at the top of the kiln. The gases of combustion in passing through the kiln heat the plates B by passing under and over them, and also heat and dry the cement, expelling all moisture from the cement.

By the above arrangement and the large amount of heating-surface thereby produced I am enabled to dry cement very quickly, the cement passing out of the kiln with the same speed as it is put into it, and in a continuous stream, if so desired. Its moisture is carried off by the heated gases.

It is evident that the inclines B may be made of one piece, if so desired, without departing from the spirit of my invention.

Having now described my invention, what I claim is—

1. The combination, with the kiln A, having inlets and outlets for the heat and the material being dried, of an interior spirally-arranged series of inclined plates, B, which are narrower than the radius of the kiln, whereby a central flue is formed, substantially as described.

2. The combination, with the kiln A, having inlets and outlets for the heat and the material being dried, of an interior spirally-arranged series of inclined plates, B, having ledges $d$ at their edges, whereby a central flue is formed, substantially as described.

H. A. BRADLEY.

Witnesses:
GUSTAV SCHNEPPÉ,
HARRY M. TURK.